United States Patent [19]

Nendzig et al.

[11] Patent Number: 5,544,898

[45] Date of Patent: Aug. 13, 1996

[54] SEALING RING FOR A SHUT-OFF VALVE HAVING A MULTI-PLY STRUCTURE

[75] Inventors: Gerhard Nendzig, Gaaden; Alfred Taus, Guntramsdorf, both of Austria

[73] Assignee: Klinger AG, Zug, Switzerland

[21] Appl. No.: 326,602

[22] Filed: Oct. 20, 1994

Related U.S. Application Data

[62] Division of Ser. No. 165,111, Dec. 10, 1993, Pat. No. 5,381,818.

[30] Foreign Application Priority Data

Dec. 12, 1992 [DE] Germany ............................ 42 41 963.8
Aug. 23, 1993 [DE] Germany ............................ 9312956 U

[51] Int. Cl.⁶ ...................................... F16J 15/26
[52] U.S. Cl. ........................ 277/166; 277/233; 277/235 R
[58] Field of Search ..................................... 277/233, 234, 277/204, 166, 123–125, 235 A, 235 R, 235 B, 24; 251/214, 330

[56] References Cited

U.S. PATENT DOCUMENTS

| 1,550,322 | 8/1925 | Ostrander . | |
|---|---|---|---|
| 1,927,450 | 9/1933 | Balfe | 277/234 |
| 1,948,252 | 2/1934 | Bailey | 277/235 B |
| 1,992,967 | 3/1935 | Roy | 288/1 |
| 2,519,683 | 8/1950 | Marien | 277/193 |
| 3,352,316 | 5/1965 | Zahn | 137/242 |
| 3,656,766 | 4/1972 | Geffroy | 277/136 |
| 4,061,157 | 12/1977 | Hanssen | 137/242 |
| 4,234,638 | 11/1980 | Yamazoe et al. | 277/235 B |
| 4,690,411 | 9/1987 | Ban Winkle | 277/166 |
| 4,764,945 | 8/1988 | Tadahiro | 378/50 |
| 4,892,320 | 1/1990 | Tuckmantel | 277/125 |
| 5,338,004 | 8/1994 | Heil | 277/125 |

FOREIGN PATENT DOCUMENTS

| 272649 | 7/1927 | France . |
| 1775691 | 6/1972 | Germany . |
| 3631447A1 | 9/1986 | Germany . |

*Primary Examiner*—William A. Cuchlinski, Jr.
*Assistant Examiner*—John L. Beres
*Attorney, Agent, or Firm*—Chilton, Alix & Van Kirk

[57] ABSTRACT

A shut-off valve includes a housing defining a flow channel and a bore for receiving a rotary actuator, a valve member, and first and second seal rings. The first seal ring cooperates with the valve member to close and seal the flow channel. The second seal ring cooperates with the valve member to seal the actuator bore. The seal rings are composed of radially extending metal lamellae interposed between soft material lamellae. The soft material lamellae are composed of lubricating material having a non-homogeneous structure which have the capacity to form radial freely extending sliding layers. The metal lamellae have, at least in the region around the inside surface of the seal rings, axial deformations. Such axial deformations provide positive mechanical connection to the adjoining soft material lamellae, restricting the soft material sliding layers to at most one third of the lamellae thickness.

8 Claims, 4 Drawing Sheets

SEALING RING FOR A SHUT-OFF VALVE HAVING A MULTI-PLY STRUCTURE

This is a divisional of application Ser. No. 165,111 filed on Dec. 10, 1993 now U.S. Pat. No. 5,381,818.

BACKGROUND OF THE INVENTION

1. Field of the Invention

This invention relates generally to valves having a housing defining a flow channel, an axially displaceable valve member and a pair of sealing or packing rings which cooperate with the valve member to control flow and prevent leakage. More particularly, the present invention relates to shut-off valves having first and second sealing rings and to sealing rings comprised of axially alternating layers of radially extending soft material lamellae and metal lamellae, the soft material lamellae having a non-homogeneous structure.

2. Description of the Prior Art

The soft material lamellae employed in prior art shut-off valves which employ a piston-type valve member are typically comprised of rubber-asbestos (IT) material or expanded graphite. Such soft materials are non-homogeneous and consist of particles with interposed voids. Such voids prove to be a disadvantage when, in the operation of the valve, the operating system pressure suddenly drops. If such voids are filled with liquid, the sudden pressure drop may cause the liquid to flash to the vapor state. When this happens, the sudden increase in the volume of the contents of multiple voids results in explosive medium shock waves which propagate toward or away from the shell surface, i.e., the axial surface of the seal ring which contacts the valve member. The shock waves cause the soft material to flow, displacing parts of the seal ring sealing lamellae. Such relative displacements can result in sealing ring failure. The likelihood of this failure mode is particularly high in valves located upstream of condensate traps. In order to prevent seal ring damage, the addition of metal lamellae between layers of soft material lamellae to provide additional strength to the seal ring is well known in the art. However, such compound seal rings are still subject to damage from such explosive medium shocks, the shock waves causing the soft material lamellae to slide over the adjacent metal lamellae, thereby displacing parts of the sealing lamellae.

SUMMARY OF THE INVENTION

The present invention overcomes the above-discussed and other deficiencies and disadvantages of the prior art by providing an improved shut-off valve, wherein a sudden large drop in operating pressure does not cause destruction of the sealing ring, and a novel sealing arrangement for use in such a valve.

Briefly stated, the invention in a preferred form is a shut-off valve having first and second seal rings composed of alternating layers of radially extending soft material lamellae and metal lamellae wherein preformed axial deformations provide positive connection between adjoining lamellae. Such positive connection restricts the sliding of the soft material lamellae on the metal lamellae upon the occurrence of explosive medium shocks.

The axial deformations may be formed in a number of ways and may be located in various areas of the seal rings. Preferably, the axial deformations are made in such a way that no relative motion, i.e., sliding in the radial direction within a layer is possible in the seal ring. For this purpose, claw-like projections can be formed by piercing the metal lamellae before they are joined to the soft material lamellae. The height of the resulting projections corresponds to approximately the thickness of the adjacent soft material lamellae.

Alternatively, the relative sliding between adjacent layers of the sealing ring may be reduced by forming step-like flanges in the metal lamellae close to the inner diameter of the seal ring. Such flanges extend about the entire circumference of the seal ring and have a height that is at least two thirds of the thickness of the abutting soft material lamellae. The flanges restrict the radially freely extending sliding layer to at most one third of the thickness of the soft material lamellae thickness, ensuring seal integrity and proper operation of the associated valve.

At least one of the sealing rings preferably consists of multiple annular expanded-graphite soft material lamellae interposed between annular metal lamellae and having PTFE rings disposed on the two seal ring end faces. The PTFE rings have a stripping or wiping edge for bearing against the valve member. The stripping edges wipe small and very small graphite particles from the valve member surface as it is axially displaced. The inside edges of the metal lamellae provide a stripping action for coarse graphite particles. The PTFE stripping edge may be formed as a stripping lip.

The seal rings may comprise a compressed stack of alternating metal and soft material lamellae rings. The metal lamellae rings are punched from a metal sheet such that claw-like projections extend from both sides. The claw-like projections penetrate the soft material lamellae rings disposed on either side of each metal ring when the stack is compressed.

BRIEF DESCRIPTION OF THE DRAWING

The present invention may be better understood and its numerous objects and advantages will become apparent to those skilled in the art by reference to the accompanying drawings wherein like reference numerals refer to like elements in the several figures and in which.

DETAILED DESCRIPTION OF THE PREFERRED EMBODIMENT

Figure 1:
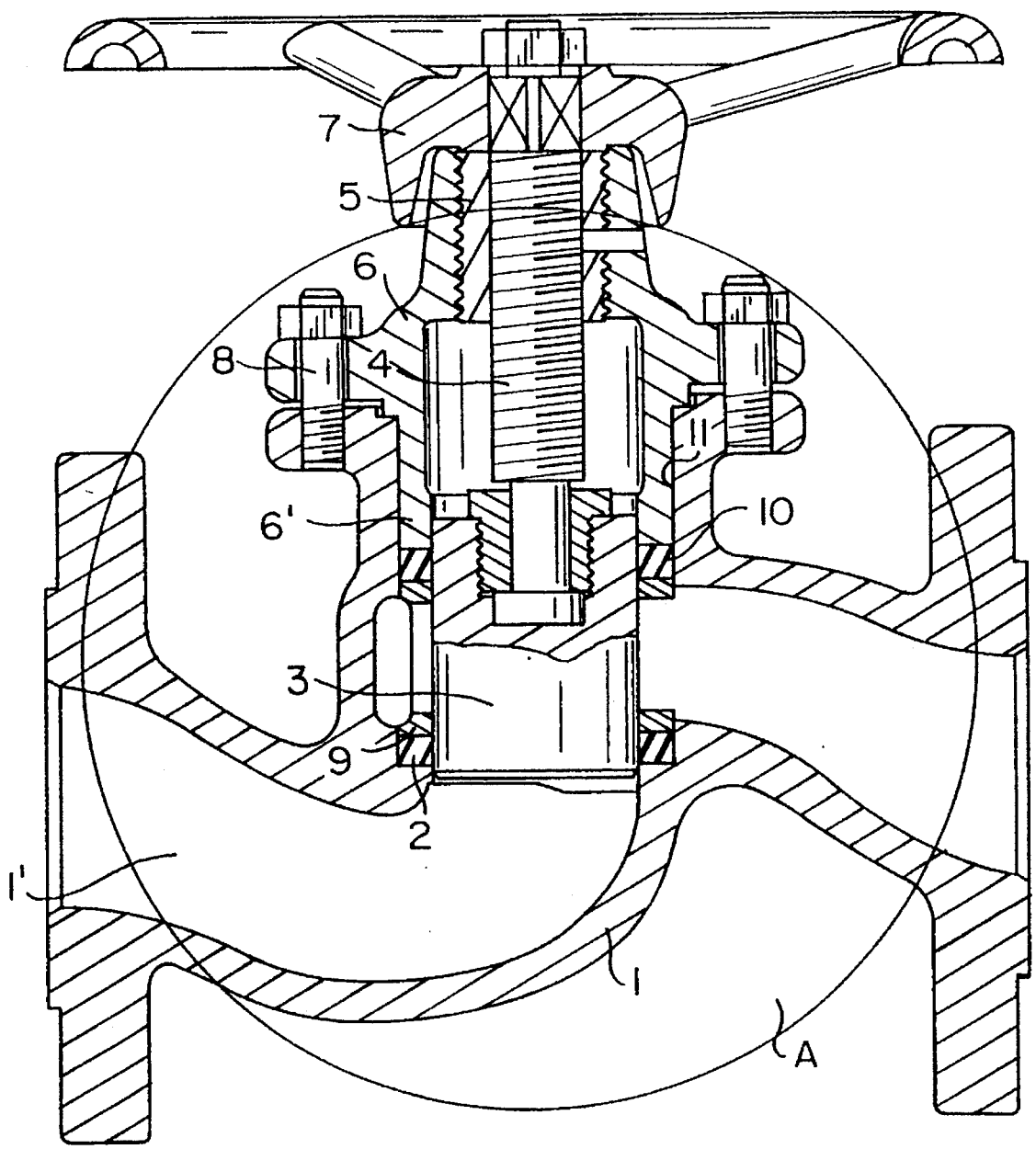
FIG. 1 is an cross-sectional, side elevation view of a shut-off valve in accordance with the invention.

With reference to the drawings, wherein like numerals represent like parts throughout the several figures, a shut-off valve in accordance with the present invention comprises a lower casing or housing 1 which defines a flow channel 1' and an actuator receiving bore 11. The valve further comprises an upper casing 6, a piston or valve member 3, a drive spindle 4, a rotatable actuator 7 and first and second seal rings which are indicated respectively at 2 and 10. In the closed position, as shown in FIG. 1, the flow channel 1', i.e., the fluid path between housing defined inlet and outlet ports, is closed by means of the piston 3. The piston 3 is axially displaceable from the closed position in which it is shown to an open position by means of imparting rotation to the spindle 4. The spindle 4 is axially movable in bore 11 by means of a threaded coupling 5 which interconnects the upper casing 6 to the valve actuator or handle 7. A tubular expansion 6' of the upper casing 6 is coaxially received within the lower casing bore 11. The upper casing 6 is firmly mounted to the lower casing 1 by means of stud bolts 8. The bore 11 receiving the first, i.e., the lower, and the second, i.e., the upper, sealing rings. Bore 11 also receives a cage-type spacer 9. Spacer 9 extends between, and both locates and supports, the sealing rings 1 and 10.

Figure 2:
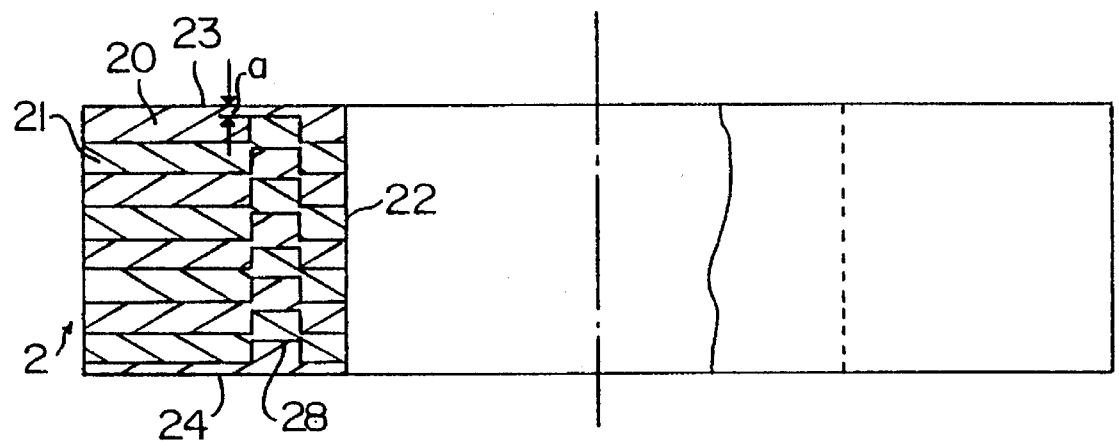
FIG. 2 is an enlarged side elevation view, partly in section, of a first seal ring for the shut-off valve of FIG. 1.

As shown in FIG. 2, the first seal ring 2 is built up from alternating rings of soft material lamellae 20 and metal lamellae 21. The soft material lamellae 20 are preferably composed of expanded graphite. Each of the metal lamellae 21 is provided with an axial deformation in the form of a flange 28. The flanges 28 are concentrically arranged adjacent to the shell surface 22, i.e., the ring surface which contacts the piston 3, and have a height at least equal to two thirds of the thickness of the adjacent soft material lamellae 20. The flanges 28 thus restrict the thickness a of the freely extending, i.e., the potentially sliding, soft material layer to at most one third of the thickness of the soft material lamellae 20. The first seal ring 2 has soft material lamellae 20 on the oppositely disposed seal ring end faces 23, 24.

Figure 3:
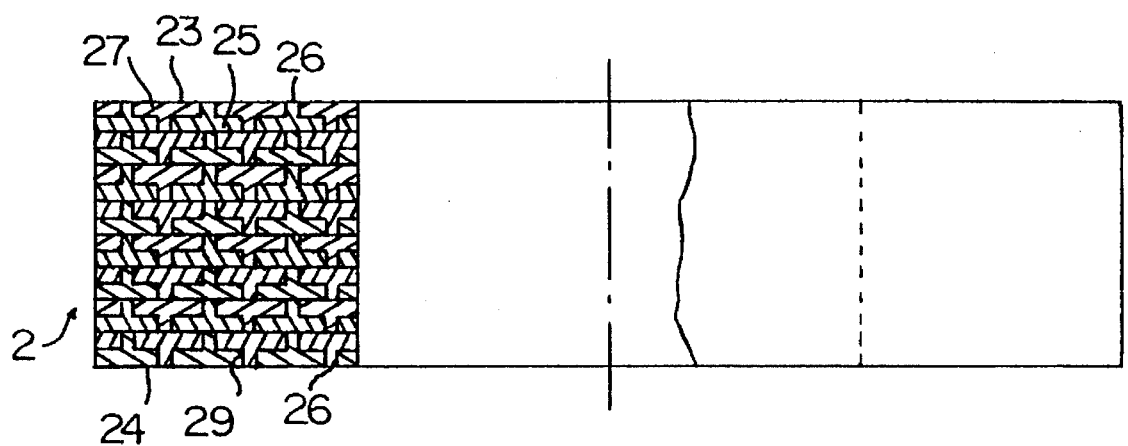
FIG. 3 is a view similar to FIG. 2 of an alternate embodiment of the first seal ring of the value of FIG. 1.
Figure 4:
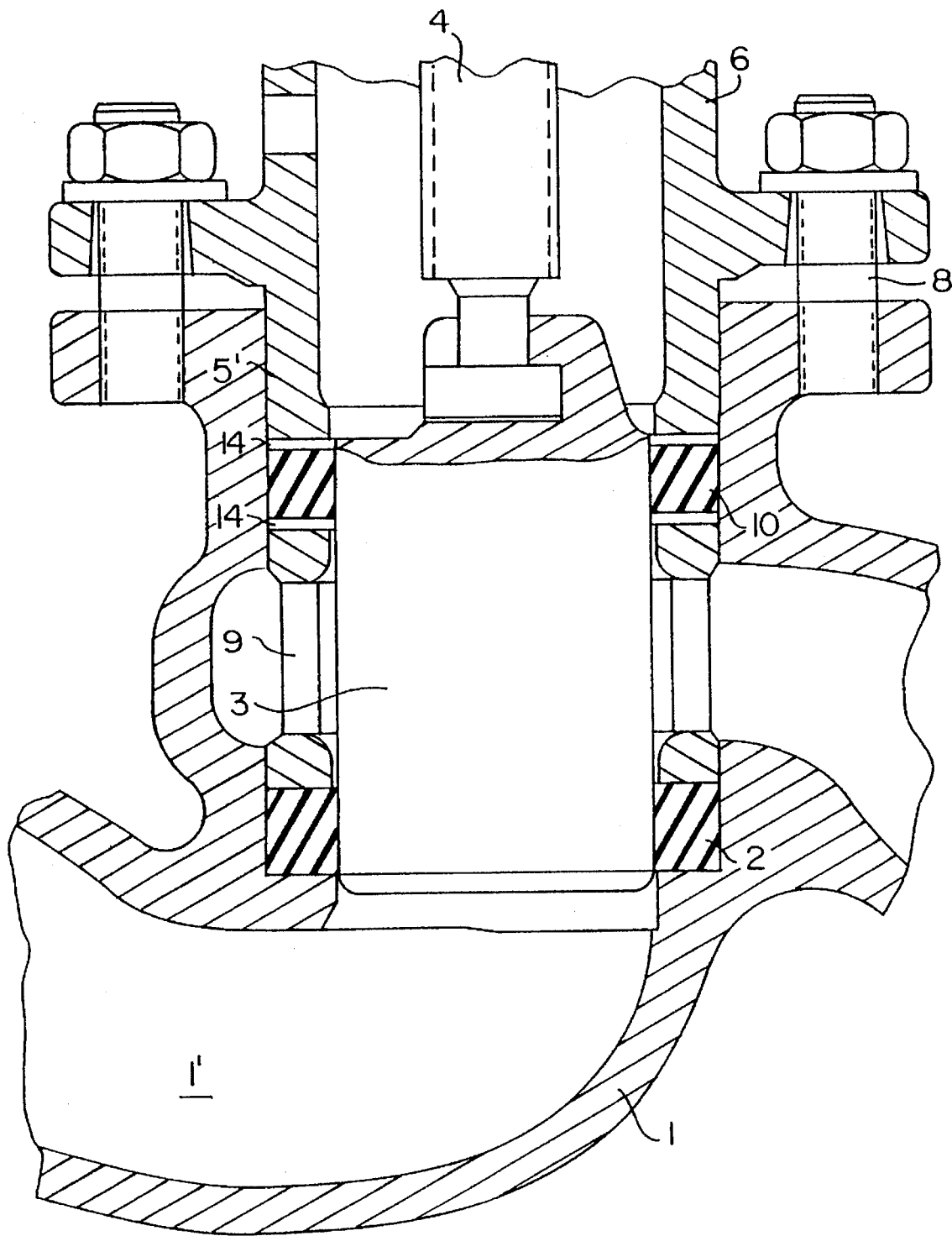
FIG. 4 is an enlarged view of area A of FIG. 1.

The alternative embodiment shown in FIG. 3 has metal lamellae 25 with regularly arranged penetrations 26. The metal tips produced in the course of forming the penetrations extend through the entire thickness of the soft material lamellae 27 arranged on either side. Such metal lamellae 25 are manufactured from a metal sheet web which already has regularly arranged penetrations 26 in the form of claw-type projections 29 extending to both sides of the metal sheet. In the course of forming the sealing rings, a web of expanded graphite is rolled into contact with both sides of the metal lamellae 25. Rolling the expanded graphite into contact with the metal lamellae 25 causes the claw-type projections 29 to completely penetrate the expanded graphite. Additionally, rolling preferably increases the expanded graphite density from an initial density of 1 g/cm³ to a final density of 1.3 g/cm³. Sliding soft material layers cannot form in a first seal ring 2 manufactured in this manner, precluding destruction by explosive medium shock.

The manufacture can, however, also be carried out according to the method described above from rings consisting of metal lamellae 25 coated on one side with an expanded graphite lamella 27. The seal ring is compressed during final assembly, driving the claw-type projections into the adjoining soft material lamellae 27 and increasing the expanded graphite density to greater than 1.6 g/cm³ to produce a particularly intimate bond.

Figure 5:
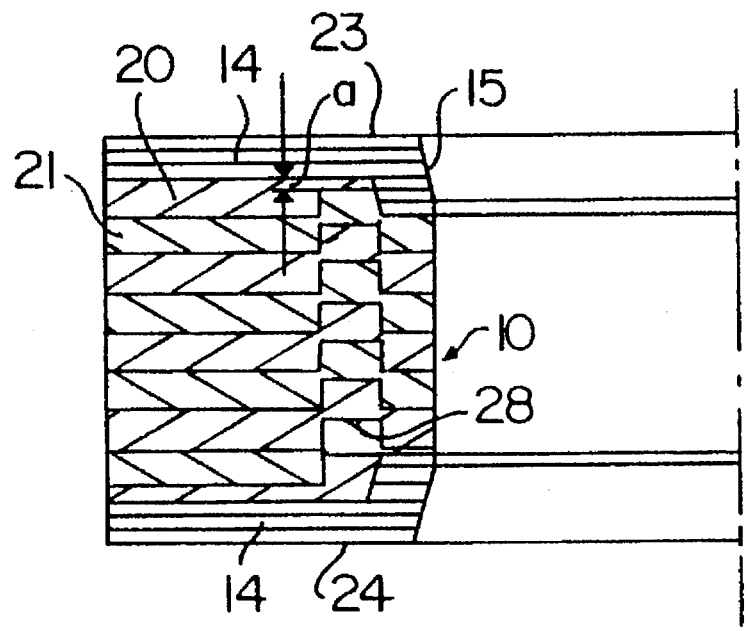
FIG. 5 is an enlarged side elevation view, partly in section, of a second seal ring for the shut-off valve of FIG. 1.

As shown in FIG. 5, the second seal ring 10 may be comprised of alternating layers of expanded graphite soft material lamellae 20 and metal lamellae 21. An axial deformation in the form of a flange 28 is made on each of the metal lamellae 21. The flanges 28 are concentrically arranged adjacent to the seal ring contact surface which faces the piston 3. Flanges 28 have a height at least equal to two thirds of the thickness of the adjacent soft material lamellae 20. Therefore, the flanges 28 restrict the thickness a of the freely extending sliding soft material layer to at most one third of the thickness of the soft material lamellae 20. The second seal ring 10 may be manufactured in the same manner as the first seal ring 2.

The upper and lower end faces 23 and 24 respectively of the second seal ring 10 may be faced with a ring 14 of polytetrafluoroethylene (PTFE). The PTFE ring 14 defines an impermeable covering ring and an annular stripping element. A lip-shaped wiping element 15 bears against the piston 3. During operation, the wiping element 15 wipes small and very small graphite particles off of the piston 3. Preferably, the thickness of each of the two PTFE rings 14 is about 1 to 2 mm, while the thickness of the second seal ring 10 is a multiple thereof.

Figure 6:
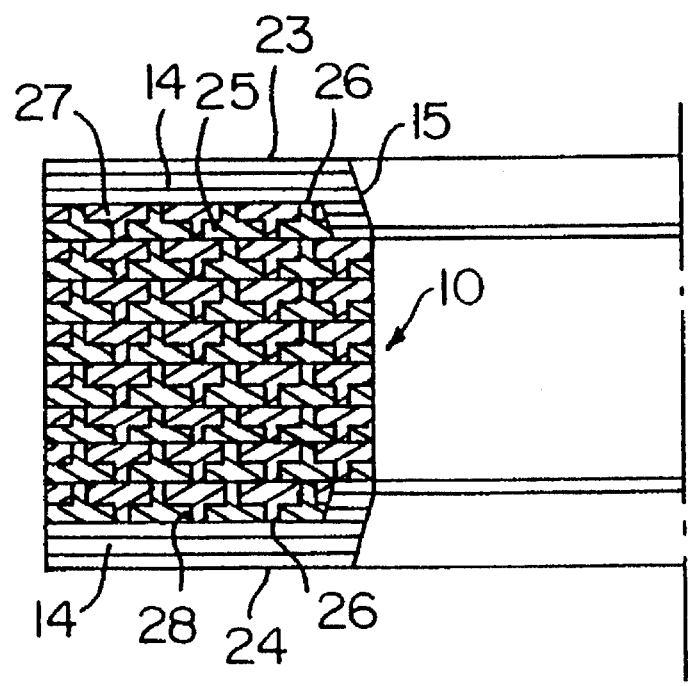
FIG. 6 is a view similar to FIG. 5 of an alternate embodiment of the second seal ring of FIG. 5.

The alternative embodiment of the second seal ring 10 shown in FIG. 6 has metal lamellae 25 with regularly arranged penetrations 26. The metal tips thus produced penetrate the entire thickness of the soft material lamellae 27 arranged on either side. The manufacture of such a second seal ring 10 can be carried out in the same manner as the first seal ring shown in FIG. 3. Alternatively, a second seal ring 10 may be manufactured according to the method described above from rings consisting of metal lamellae 25 coated on one side with an expanded graphite lamellae 27.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An annular seal ring for a shut-off valve, said seal ring having top, bottom and inside surfaces, said seal ring comprising:

radially extending first lamellae, said first lamellae comprising a soft lubricating material and having a thickness and a non-homogenous structure;

radially extending metal lamellae having top and bottom surfaces and regularly distributed projections extending from said top and bottom surfaces, said metal lamellae being interposed between and bonded to said first lamellae, said projections penetrating abutting of said first lamellae a distance corresponding to at least two thirds of the thickness of said soft material; and a pair of striping rings comprised of a material having a low coefficient of friction, one of said stripping rings being arranged on said seal ring top surface and the other of said stripping rings being arranged on said seal ring bottom surface, said stripping rings each having a stripping edge.

2. The seal ring of claim 1 wherein said stripping edges are formed on a stripping lip.

3. The seal ring of claim 2 wherein said stripping rings are comprised of PTFE and are mounted on said top and bottom seal ring surfaces.

4. The seal ring of claim 3 wherein each of said metal lamellae has a said first lamellae mounted on one of said surfaces thereof to form a composite lamellae ring, and wherein said soft material of said first lamellae comprise expanded graphite, said seal ring being comprised of a compressed stack of said thus formed composite lamellae rings.

5. The seal ring of claim 1 wherein each of said metal lamellae has a said first lamellae mounted on one of said surfaces thereof to form a composite lamellae ring, and wherein said soft material of said first lamellae comprises expanded graphite, said seal ring being comprised of a compressed stack of said thus formed composite lamellae rings.

6. An annular seal ring for a shut-off valve, said seal ring having top, bottom and inside surfaces, said seal ring comprising:

radially extending first lamellae, said first lamellae being comprised of a soft lubricating material and having a thickness and a non-homogenous structure;

radially extending metal lamellae having top and bottom surfaces, said metal lamellae each having a circumferential step-like flange located adjacent the seal ring inside surface, said metal lamellae being interposed between and bonded to adjacent of said first lamellae, said step-like flanges having a height equal to at least two thirds of said thickness of the adjacent of said first lamellae; and a pair of stripping rings comprised of a material having a low coefficient of friction, one of said stripping rings being arranged on said seal ring top surface and the other of said stripping rings being arranged on said seal ring bottom surface, said stripping rings each having a stripping edge.

7. The seal ring of claim 6 wherein said stripping edges are formed on a stripping lip.

8. The seal ring of claim 7 wherein said stripping rings are comprised of PTFE and are mounted on said top and bottom seal ring surfaces, and wherein said soft material of said first lamellae comprise expanded graphite.

* * * * *